Patented Dec. 1, 1931

1,834,057

UNITED STATES PATENT OFFICE

HERMAN L. HENZERLING, OF WEST NEW BRIGHTON, NEW YORK, ASSIGNOR TO ROYAL BAKING POWDER COMPANY, OF NEW YORK, N. Y., A CORPORATION OF NEW JERSEY

CONVERSION OF CARBOHYDRATES TO PRODUCTS OF HIGHER OXIDATION

No Drawing. Application filed October 26, 1923. Serial No. 670,828.

The invention relates to the conversion of certain carbohydrates to obtain substances of higher oxygen content, and has for its object providing a process whereby such conversion may be accomplished with better yields and more certain results than heretofore obtained.

The invention has been developed particularly in connection with the conversion of starch to tartaric acid or tartrates by the use of strong acid solutions and the introduction of a nitrate thereto. For example, a mixture of corn-starch and sulphuric acid is first heated, say 100 parts of starch to 90 parts $H_2SO_4$, of about 50-52° Baumé, until the desired inversion takes place. The product is then diluted by the addition of an acid solution, say, 180 parts of $H_2SO_4$ and 500 parts water, and, preferably as the dilution is in progress, a nitrate, say, 100 parts of sodium nitrate or a corresponding amount of the potassium or other nitrate salt, is added and the mixture heated, replacing the evaporated water, until the desired conversion is effected, say, for two or three days, finally concentrating the product to syrup consistency. The product thus formed may be transformed into calcium tartrate by the addition of a suitable calcium salt and further transformed by the addition of sulphuric acid into tartaric acid.

The use of strong solutions—say about 50 per cent or more acid—enables the reaction and oxidation to be controlled so as to secure the desired product. The use of a nitrate is preferable to the use of nitric acid, which, however, is, of course, formed in the mixture and might be substituted with less satisfactory results. The principle of the invention is applicable to the conversion of other carbohydrates to substances of higher oxidation.

I claim:

1. In the process of deriving tartaric acid products from carbohydrates by inversion and conversion, of the character described, the inversion step of mixing a carbohydrate with an approximately equal amount of sulphuric acid of about 50-52° Baumé.

2. In the process of deriving tartaric acid products from carbohydrates by inversion and conversion, of the character described, the inversion step of mixing a carbohydrate with sulphuric acid of about 50-52° Baumé, and in the ratio of about 90 parts sulphuric acid to about 100 parts carbohydrates.

3. In the process of deriving tartaric acid products from carbohydrates by inversion and conversion, of the character described, the inversion steps of mixing a carbohydrate with an approximately equal amount of sulphuric acid of about 50-52° Baumé, and subjecting the mixture to heat until the desired inversion is obtained.

4. The process for deriving tartaric acid products from carbohydrates, which includes the inversion step of mixing a carbohydrate with an approximately equal amount of sulphuric acid of 50-52° Baumé, and the conversion step of adding to the inversion product an oxidizing substance containing the nitrate radical.

5. The process for deriving tartaric acid products from carbohydrates, which includes the inversion step of mixing a carbohydrate with an approximately equal amount of sulphuric acid of 50-52° Baumé, and the conversion step of adding sodium nitrate to the inversion product.

6. The process for deriving tartaric acid products from carbohydrates, which includes the inversion step of mixing a carbohydrate with an approximately equal amount of sulphuric acid of 50-52° Baumé, and the conversion step of adding potassium nitrate to the inversion product.

7. The process for the conversion of carbohydrates to tartrates, which includes, mixing together a carbohydrate and sulphuric acid of about 50-52° Baumé in approximately equal parts and subjecting the mixture to heat until the desired inversion occurs, and converting the inversion product by subjecting said product to an oxidizing substance containing the nitrate radical.

8. The process for the conversion of starch to tartrates, which includes, mixing together a starch and sulphuric acid of about 50-52° Baumé in approximately equal parts and subjecting the mixture to heat until the desired inversion occurs, and converting the inversion product by subjecting said product to an oxidizing substance containing the nitrate radical.

9. In the process of deriving tartaric acid products from carbohydrates by inversion and conversion of the character described, the inversion step of mixing a carbohydrate with an approximately equal amount of a strong acid having a strength of at least 50 per cent.

10. In a process of deriving tartaric acid products from carbohydrates by inversion and conversion of the character described, the inversion step of mixing a carbohydrate with an approximately equal amount of a strong acid having a strength of at least about 50 per cent and subjecting the mixture to heat until the desired inversion is obtained.

11. The process for deriving tartaric acid products from carbohydrates which includes the inversion step of mixing a carbohydrate with a strong acid having a strength of at least about 50 per cent, and in approximately equal amounts, subjecting the mixture to heat until the desired inversion is obtained, and the conversion step of adding to the inversion product an oxidizing substance containing a nitrate radical.

12. The process for conversion of starch to a tartrate which includes mixing starch with a strong acid having a strength of at least about 50 per cent in approximately equal amounts, subjecting the mixture to heat until the desired inversion is obtained, and converting the inversion product by subjecting said product to an oxidizing substance containing a nitrate radical.

13. The process for deriving tartaric acid products from starch which includes the inversion step of mixing starch with an approximately equal amount of sulphuric acid of about 50° to 52° Baumé, heating until the desired inversion is obtained, then diluting by the addition of a dilute sulphuric acid, and the conversion step of adding sodium nitrate to the mixture containing the inversion product and further heating.

HERMAN L. HENZERLING.